(12) United States Patent
Chell

(10) Patent No.: US 7,038,565 B1
(45) Date of Patent: May 2, 2006

(54) ROTATING DIPOLE PERMANENT MAGNET ASSEMBLY

(75) Inventor: Jeremy Chell, Madison, WI (US)

(73) Assignee: Astronautics Corporation of America, Milwaukee, WI (US)

( * ) Notice: Subject to any disclaimer, the term of this patent is extended or adjusted under 35 U.S.C. 154(b) by 0 days.

(21) Appl. No.: 10/864,827

(22) Filed: Jun. 9, 2004

Related U.S. Application Data (60) Provisional application No. 60/476,969, filed on Jun. 9, 2003.

(51) Int. Cl.
*H01F 7/00* (2006.01)

(52) U.S. Cl. ............... 335/229; 335/306; 310/154.43; 310/154.06

(58) Field of Classification Search ............. 310/10, 310/12, 36, 154.06, 154.43, 310, 15; 335/229–237, 335/302–306
See application file for complete search history.

(56) References Cited

U.S. PATENT DOCUMENTS

| | | | |
|---|---|---|---|
| 4,033,734 A | 7/1977 | Steyert, Jr. et al. | |
| 4,069,028 A | 1/1978 | Brown | |
| 4,107,935 A | 8/1978 | Steyert, Jr. | |
| 4,112,699 A | 9/1978 | Hudson, III et al. | |
| 4,203,740 A | 5/1980 | Vaseen | |
| 4,332,135 A | 6/1982 | Barclay et al. | |
| 4,392,356 A | 7/1983 | Brown | |
| 4,408,463 A | 10/1983 | Barclay | |
| 4,441,325 A | 4/1984 | Bon-Mardion et al. | |
| 4,453,114 A | 6/1984 | Nordlund | |
| 4,459,811 A | 7/1984 | Barclay et al. | |
| 4,464,903 A * | 8/1984 | Nakagome et al. | ........... 62/3.1 |
| 4,483,341 A | 11/1984 | Witteles | |
| 4,507,927 A | 4/1985 | Barclay | |
| 4,507,928 A | 4/1985 | Johnson | |
| 4,514,987 A | 5/1985 | Pundak et al. | |
| 4,532,770 A | 8/1985 | Hakuraku et al. | |
| 4,625,519 A | 12/1986 | Hakuraku et al. | |
| 4,702,090 A | 10/1987 | Barclay et al. | |
| 4,704,871 A | 11/1987 | Barclay et al. | |
| 4,727,721 A | 3/1988 | Peschka et al. | |

(Continued)

FOREIGN PATENT DOCUMENTS

FR 2 574 913 6/1986

(Continued)

OTHER PUBLICATIONS

Supplementary European Search Report issued Feb. 25, 2005 on EP 02795829.

(Continued)

*Primary Examiner*—Lincoln Donovan
(74) *Attorney, Agent, or Firm*—Foley & Lardner LLP (57) ABSTRACT

A permanent magnet assembly is disclosed that utilizes at least two rotating magnet subassemblies, and first and second stationary magnet subassemblies arranged so that their magnetic vectors oppose each other. At a first rotational position of the rotating magnet subassemblies, the magnetic vectors of the rotating magnet subassemblies align with the magnetic vector of the first stationary magnet subassembly and oppose the magnetic vector of the second stationary magnet subassembly. At a second rotational position, the magnetic vectors of the rotating magnet subassemblies are reversed, thereby aligning with the magnetic vector of the second stationary magnet subassembly and opposing the magnetic vector of the first stationary magnet subassembly. By locating air gap portions where the magnetic vectors of the rotating magnetic subassemblies meet the magnetic vectors of the stationary magnetic subassemblies, the air gap portions are subjected to a time-varying magnetic flux density.

28 Claims, 8 Drawing Sheets

U.S. PATENT DOCUMENTS

| | | | |
|---|---|---|---|
| 4,727,722 A | 3/1988 | Kirol | |
| 4,785,636 A | 11/1988 | Hakuraku et al. | |
| 4,901,047 A | 2/1990 | Wipf | |
| 4,916,907 A | 4/1990 | Munk et al. | |
| 5,012,060 A | 4/1991 | Gerard et al. | |
| 5,024,059 A | 6/1991 | Noble | |
| 5,091,361 A | 2/1992 | Hed | |
| 5,156,003 A | 10/1992 | Yoshiro et al. | |
| 5,162,771 A | 11/1992 | Abele | |
| 5,165,242 A | 11/1992 | Chang | |
| 5,177,970 A | 1/1993 | Chang | |
| 5,182,914 A * | 2/1993 | Barclay et al. | 62/3.1 |
| 5,209,068 A | 5/1993 | Saji et al. | |
| 5,249,424 A | 10/1993 | DeGregoria et al. | |
| 5,329,267 A | 7/1994 | Endoh, et al. | |
| 5,332,029 A | 7/1994 | Tokai et al. | |
| 5,381,664 A | 1/1995 | Bennett et al. | |
| 5,428,335 A | 6/1995 | Leupold et al. | |
| 5,444,983 A | 8/1995 | Howard | |
| 5,447,034 A | 9/1995 | Kuriyama et al. | |
| 5,495,222 A | 2/1996 | Abele et al. | |
| 5,596,304 A | 1/1997 | Tatchyn | |
| 5,635,889 A | 6/1997 | Stelter | |
| 5,641,424 A | 6/1997 | Ziolo et al. | |
| 5,742,106 A * | 4/1998 | Muraji | 310/36 |
| 5,743,095 A | 4/1998 | Gschneidner, Jr. et al. | |
| 5,790,006 A | 8/1998 | Abele et al. | |
| 5,864,275 A | 1/1999 | Ohashi et al. | |
| 5,886,609 A | 3/1999 | Stelter | |
| 5,887,449 A | 3/1999 | Pecharsky et al. | |
| 5,903,069 A * | 5/1999 | Hiterer | 310/15 |
| 5,934,078 A | 8/1999 | Lawton, Jr. et al. | |
| 5,942,962 A | 8/1999 | Gery | |
| 5,963,117 A | 10/1999 | Ohashi et al. | |
| 6,044,899 A | 4/2000 | Langley et al. | |
| 6,079,213 A | 6/2000 | Driehuys et al. | |
| 6,084,498 A | 7/2000 | Stelter et al. | |
| 6,109,343 A | 8/2000 | Langley et al. | |
| 6,250,087 B1 | 6/2001 | Owada et al. | |
| 6,269,648 B1 | 8/2001 | Hasson et al. | |
| 6,293,111 B1 | 9/2001 | Nacher et al. | |
| 6,305,190 B1 | 10/2001 | Driehuys et al. | |
| 6,446,441 B1 | 9/2002 | Dean | |
| 6,467,274 B1 | 10/2002 | Barclay et al. | |
| 6,526,759 B1 | 3/2003 | Zimm et al. | |
| 6,573,817 B1 * | 6/2003 | Gottschalk | 335/306 |
| 6,668,560 B1 | 12/2003 | Zimm et al. | |
| 6,680,663 B1 | 1/2004 | Lee et al. | |
| 2002/0053209 A1 | 5/2002 | Zimm et al. | |
| 2005/0046533 A1 * | 3/2005 | Chell | 335/306 |

FOREIGN PATENT DOCUMENTS

| | | | |
|---|---|---|---|
| JP | 62 106271 | 5/1987 | |
| RU | 2 040 704 | 7/1995 | |

OTHER PUBLICATIONS

Supplementary Partial European Search Report issued Jan. 4, 2005 on EP 02795829.

C.R. Cross, et al., "Optimal Temperature-Entropy Curves for Magnetic Refrigeration," Advances in Cryogenic Engineering, vol. 33, pp. 767-776, 1988, and Cryogenic Engineering Conference, Jun., 1987.

L.D. Kirol, et al., "Rotary Recuperative Magnetic Heat Pump," in Advances in Cryogenic Engineering, 1988.

A.J. DeGregoria, et al., "Test Results of an Active Magnetic Regenerative Refrigerator," Advances in Cryogenic Engineering, vol. 37B, 1991, and Cryogenic Engineering Conf., 1991, Jun. 11-14, 1991, Huntsville, Alabama.

A.J. DeGregoria, et al., "Modeling the Active Magnetic Regenerator," Advances in Cryogenic Engineering, vol. 37B, 1991, and Cryogenic Engineering Conf., 1991, Jun. 11-14, 1991, Huntsville, Alabama.

"The Big Chill . . . Magnetic Refrigeration Technology Makes a Cool Debut," the "Insider," Ames Laboratory, Department of Energy, Ames, Iowa, Feb., 1997.

"New Fridge Technology on the Horizon," The Capital Times, Feb. 21, 1997.

K.A. Gschneidner, Jr., "Magnetic Refrigeration," in Rare Earths: Science, Technology and Applications III, The Minerals, Metals and Materials Society, 1997, pp. 209-221.

S. J. Lee et al, "Permanent Magnet Array for the Magnetic Refrigerator", Journal of Applied Physics, vol. 91, No. 10, May 15, 2002.

S. J. Lee et al., "Modeling and simulation of a permanent magnet array in elliptical configurations", Proceedings of the 2000 International Conference on Modeling and Simulation of Microsystems.

"Permanent Magnet Array for the Magnetic Refrigerator", Journal of Applied Physics, vol. 91, No. 10, May 15, 2002.

* cited by examiner

FIG. 12

ROTATING DIPOLE PERMANENT MAGNET ASSEMBLY

CROSS-REFERENCE TO RELATED APPLICATION

This application claims the benefit of provisional patent application 60/476,969, filed Jun. 9, 2003, the disclosure of which is incorporated by reference.

FIELD OF THE INVENTION

This invention relates generally to magnets, and more particularly to a composite magnet structure specially adapted to provide a time-varying high amplitude magnetic field across an air gap.

BACKGROUND OF THE INVENTION

Permanent magnets have been used for many years and for many purposes. However, new applications of permanent magnets are driving the development of increasingly sophisticated permanent magnet assemblies.

A permanent magnet assembly that can produce a periodic high amplitude magnetic field intensity across a gap is of particular interest. For example, such a permanent magnet assembly can be used to apply a time-varying magnetic field to magnetocaloric materials. Magnetocaloric materials near a transition from a ferromagnetic state to a paramagnetic state will warm when magnetized and cool when demagnetized. This property can be used to provide heating or cooling, for example in a magnetic refrigerator.

SUMMARY OF THE INVENTION

A permanent magnet assembly according to the present invention preferably utilizes at least two rotating magnet subassemblies and at least two stationary magnet subassemblies wherein the rotary motion of the rotating magnet subassemblies causes them to alternatively align with one stationary magnet subassembly and then with the other stationary magnet subassembly, whereby a time-varying magnetic flux density may be efficiently generated within one or more portions of an air gap.

A preferred embodiment of a permanent magnet assembly according to the present invention utilizes two synchronized counter-rotating magnet subassemblies at the midpoint between two stationary magnet subassemblies, where each rotating magnet subassembly includes a rectangular permanent magnet section and two rounded end caps made of magnetically permeable material, and each stationary magnet subassembly includes two permanent magnet sections plus two concave sections and a flux return section made of magnetically permeable material. In this embodiment, the concave sections of the stationary magnet assemblies surround two air gap portions, one air gap portion for each stationary magnet assembly, and the rotary motion of the rotating dipoles causes the intensity of the magnetic field through these air gap portions to oscillate, with the intensity of the magnetic field through one air gap portion maximized when the intensity of the magnetic field through the other air gap portion is minimized.

A variety of structures can be used in an apparatus according to the invention. For example, each stationary magnet subassembly may include only a single permanent magnet portion, or it may include more than the two permanent magnet portions found in the preferred embodiment. Instead of the two rotating magnetic subassemblies found in the preferred embodiment, there could be only a single rotating magnet subassembly, or there could be a greater number of rotating magnetic subassemblies. The relative dimensions, shapes, and positions of the rotating magnetic subassemblies and the stationary magnetic subassemblies could be optimized for a particular application.

A magnet assembly according to the invention, incorporating rotating dipole magnet blocks to provide a periodic high amplitude magnetic field intensity within an air gap, can have several desirable features.

Such a magnet assembly can provide a wide variation in magnetic field intensity in an air gap. Field intensities of at least 1.5 Tesla in a high-field air gap portion concurrent with fields of less than 0.05 Tesla in a low-field air gap portion have been observed through modeling of the assembly in this position.

The air gap experiencing the time-varying magnetic field intensity in such a magnet assembly can have a particular shape and structure that makes it especially useful, for example by being well suited for a magnetic refrigerator. The air gap in such a magnet assembly can be, for example, a linear air gap of rectangular cross-section. Such a magnet assembly can allow constant access to the air gap that is subject to the periodic high amplitude magnetic field intensity, and this can enable components of a magnetic refrigerator such as magnetocaloric material and heat transfer fluid plumbing to be stationary and positioned within that air gap.

A magnet assembly according to the invention can have relatively low operating costs, for example by minimizing space requirements and by minimizing the mass of any moving parts.

Such a magnet assembly can also have relatively low manufacturing costs, for example by avoiding any requirement for precisely machined permanent magnets. Each of the permanent magnet portions of such a magnet assembly can be rectangular in shape with an orthogonal magnetization vector to minimize production costs. This geometry is especially well suited to the manufacture of sintered NdFeB magnets by current pressing methods, and the relatively low number of magnet mating surfaces contributes to a reasonable number of required precision grinding operations.

Precisely machined structures can be used in a magnet assembly according to the invention, for example rounded pole caps and concave sections may have rounded surfaces that may benefit from close tolerances to allow these moving pieces to nest closely together, while still providing a continuous flux path with maximum permeance when the rotating dipoles align. However, in such a magnet assembly, these structures can be made of magnetically permeable material that are affixed to rectangular permanent magnet portions, avoiding any precision machining of permanent magnet material.

Further objects, features, and advantages of the invention will be apparent from the following detailed description when taken in conjunction with the accompanying drawings.

DETAILED DESCRIPTION OF THE INVENTION

Figure 1:
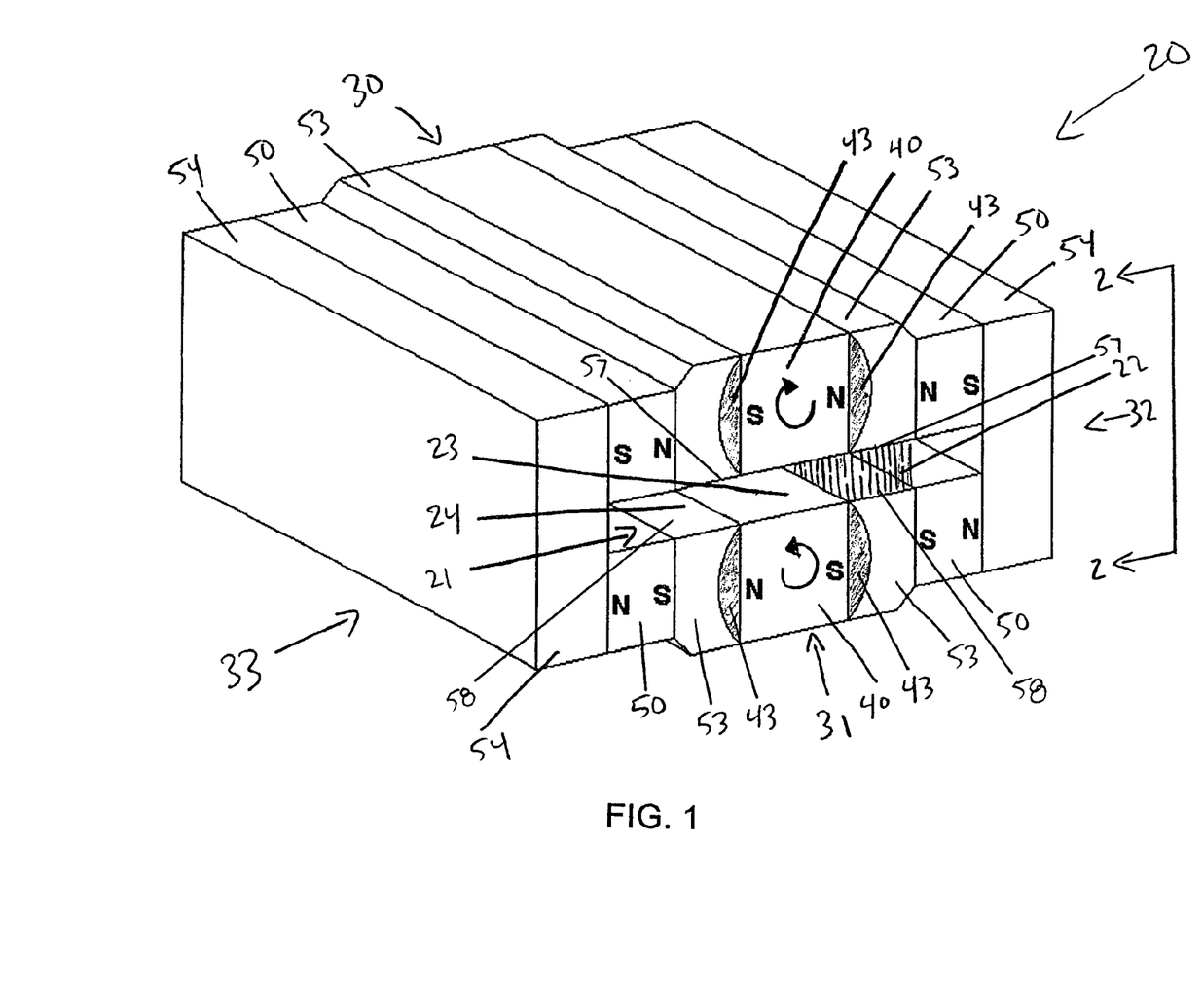
FIG. 1 is a perspective view of an exemplary magnet assembly in accordance with the invention.

Referring to the drawings, FIG. 1 is a perspective view of an exemplary magnet assembly in accordance with the invention, indicated generally at 20. The magnet assembly 20 includes a first rotating magnet subassembly, indicated generally at 30, a second rotating magnet subassembly, indicated generally at 31, a first stationary magnet subassembly, indicated generally at 32, and a second stationary magnet subassembly, indicated generally at 33.

The magnet assembly 20 at least partially surrounds an air gap, indicated generally at 21. The air gap 21 includes a first air gap portion 22 at least partially surrounded by portions of the first stationary magnet subassembly 32 and a second air gap portion 24 at least partially surrounded by portions of the second stationary magnet subassembly 33. The air gap 21 also includes a third air gap portion 23 between the first air gap portion 22 and the second air gap portion 24 and between the first rotating magnetic subassembly 30 and the second rotating subassembly 31.

When the first rotating magnet subassembly 30 and the second rotating magnet subassembly 31 are at the rotational positions shown in FIG. 1, the first air gap portion 22 experiences a high magnetic field intensity, the third air gap portion 23 experiences an intermediate magnetic field intensity, and the second air gap portion 24 experiences a low magnetic field intensity. As the first rotating magnet subassembly 30 and the second rotating magnet subassembly 31 rotate through a cycle of rotation, the first air gap portion 22 and the second air gap portion 24 of the air gap 21 alternately experience a high magnetic field intensity and then a low magnetic field intensity. Since the first air gap portion 22 and the second air gap portion 24 thereby experience a time-varying magnetic field, these air gap portions provide areas in which magnetic work may be performed.

In the magnet assembly 20, the first rotating magnet subassembly 30 and second rotating magnet subassembly 31 each include a permanent magnet portion 40 and rounded end caps 43. The permanent magnet portion 40 may be formed of any suitable permanent magnet material, for example of the type sold by Sumitomo Special Metals of Japan under the trademark Neomax 50. The rounded end caps 43 may be formed of any suitable magnetically permeable material, for example low-carbon steel such as the material sold by High Temp Metals of California, USA under the trademark Permendur 2V. It may be desirable to employ the permeable material in a laminated form or other form that has low eddy current losses.

In the magnet assembly 20, the first stationary magnet subassembly 32 and the second stationary magnet subassembly 33 preferably each include two permanent magnet portions 50, two concave sections 53, and a flux return section 54. The permanent magnet portions 50 of each stationary magnet subassembly can be formed of any suitable permanent magnetic material, for example of the types discussed above. The permanent magnet portions 50 of each stationary magnet subassembly are preferably shorter in the vertical dimension than the rotary magnet blocks to ensure minimum Gauss levels outside the high field region. The concave sections 53 and flux return section 54 of each stationary magnet subassembly can be formed of any suitable magnetically permeable material, for example of the types discussed above. The concave sections 53 include a concave cutout, preferably in the shape of a circular arc, on the side nearest the rotating magnetic subassemblies to allow for clearance of the swept path of the rotating magnetic subassemblies.

Figure 2:
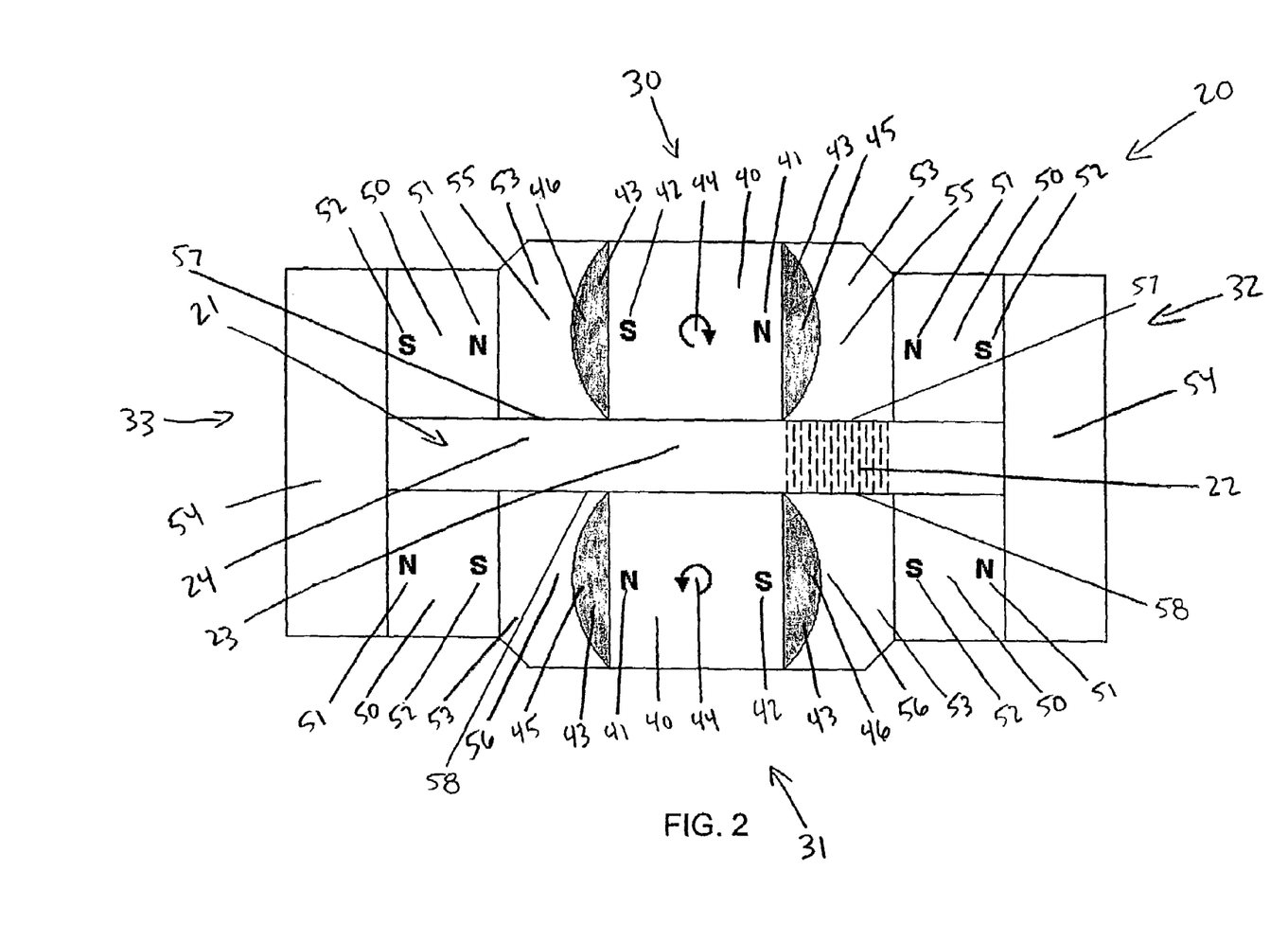
FIG. 2 is a cross-sectional view of the magnet assembly of FIG. 1 taken along the line 2—2 thereof.

FIG. 2 is a cross-sectional view of the magnet assembly 20 of FIG. 1 taken along the line 2—2 thereof. In FIG. 2, as in FIG. 1, the rotating magnetic subassemblies are positioned such that the first air gap portion 22 experiences a high magnetic field intensity and the second air gap portion 24 experiences a low magnetic field intensity.

As perhaps best shown in FIG. 2, the permanent magnet portion 40 of each rotating magnet subassembly has a North end 41 (marked "N") and a South end 42 (marked "S"). The rounded end caps 43 of magnetically permeable material coupled to each end of the permanent magnet portion 40 of each rotating magnet subassembly are preferably designed to nest within the concave sections 53 of the stationary magnetic subassemblies. Each rotating magnet subassembly has a North end 45 and a South end 46, and each rotating magnet subassembly is adapted to rotate about a rotational axis 44.

Each permanent magnet portion 50 of each stationary magnet subassembly has a North end 51 and a South end 52. Each stationary magnet subassembly, comprised of the permanent magnet portions 50, the concave sections 53, and the flux return section 54, also has a North end 55 and a South end 56.

The North end 55 of each stationary magnet subassembly includes a North pole face 57, and the South end 56 of each stationary magnet subassembly includes a South pole face 58. The first air gap portion 22 lies between the North pole face 57 and the South pole face 58 of the first stationary magnet subassembly 32, and the second air gap portion 24 lies between the North pole face 57 and the South pole face 58 of the second stationary magnet subassembly 33.

FIG. 2 and FIGS. 3(a)–(d) illustrate one half of a complete cycle of exemplary magnet assembly 20. When the rotating magnetic subassemblies are at the rotational position shown in FIG. 2, all six permanent magnets (the four permanent magnet portions 50 in the first stationary magnet subassembly 32 and second stationary magnet subassembly 33, plus the two permanent magnet portions 40 in the first rotating magnet subassembly 30 and the second rotating magnet subassembly 31), are aligned such that their combined magnetomotive force ("mmf") passes through the first air gap portion 22, thereby subjecting the first air gap portion 22 to a high magnetic field intensity.

Figure 3A:
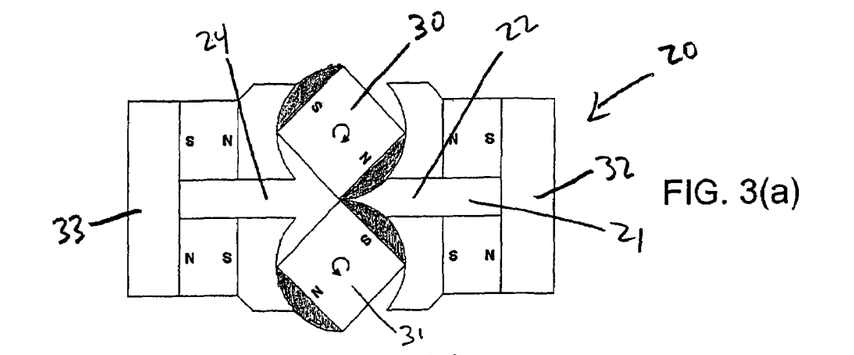
FIGS. 3(a), 3(b), 3(c), and 3(d) are cross-sectional views of the magnet assembly of FIG. 1 taken along the line 2—2 thereof, with the rotating magnet subassemblies rotated 45°, 90°, 135°, and 180° respectively.
Figure 3B:
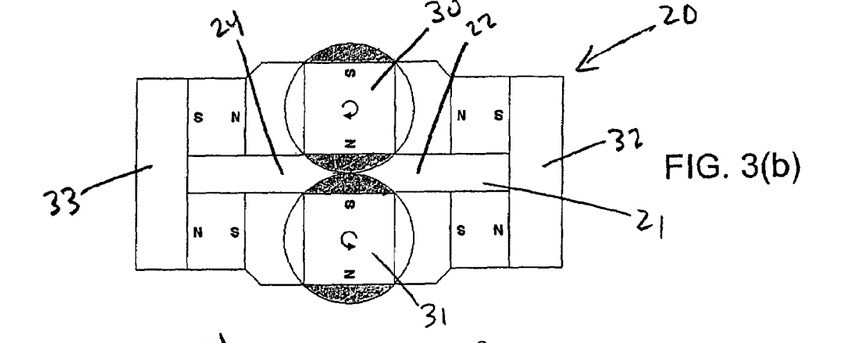
Figure 3C:
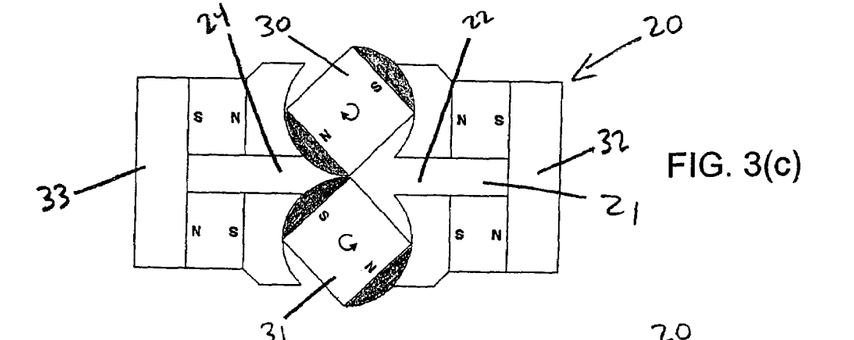
Figure 3D:
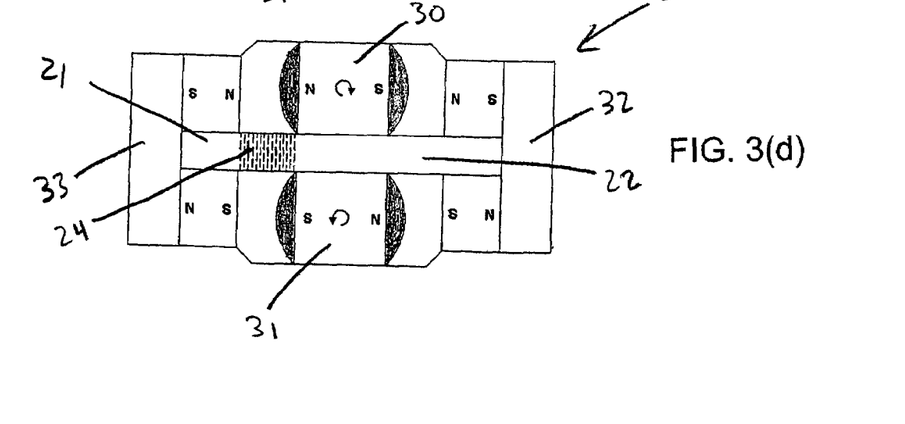

FIGS. 3(a), 3(b), and 3(c) show the exemplary magnet assembly 20 with the rotating magnetic subassemblies rotated 45°, 90°, and 135°, respectively, as the rotating magnetic subassemblies travel from their positions in FIG. 2 to their positions in FIG. 3(d). When the rotating magnetic subassemblies are at the rotational position shown in FIG. 3(d), the permanent magnet portions are aligned such that their combined magnetomotive force ("mmf") passes through the second air gap 24, thereby subjecting the second air gap portion 24 to a high magnetic field intensity as shown in FIG. 3(d). After reaching the positions in FIG. 3(d), the rotating magnetic subassemblies continue their rotation and return to the position shown in FIG. 2.

There is a unique magnetic field distribution within the air gap for each angular position of the magnets during one cycle. The maximum difference in flux density between the high and low field zones occurs whenever the rotary dipole vectors are parallel to the stationary dipole vectors. Furthermore, the difference in flux density between the two zones is at a minimum, essentially zero, when the rotary dipole vectors are perpendicular to the stationary dipole vectors. It is interesting to note that a 45-degree offset of the rotary dipole vectors relative to stationary dipole vectors results in a difference in flux density between the high and low field zones that is greater than half of the maximum difference. Thus the field change in the air gap is non-linear throughout the rotational cycle. This is a characteristic that can be encouraged by relative sizing and positioning of the magnets in an effort to minimize the portion of the cycle during which the high-field zones have a similar flux density.

Thus, the rotating magnetic subassemblies 30 and 31 together act as a switch to control which portion of the air gap receives flux contribution from the permanent magnet portions of the rotating magnetic subassemblies 30 and 31 and the stationary magnet subassemblies 32 and 33. The first air gap portion 22 and the second air gap portion 24 experience alternating high magnetic field intensity and low magnetic field intensity as the rotating magnetic subassemblies 30 and 31 move from their positions shown in FIG. 2 to their positions shown in FIG. 3(d) and back again with every cycle of the rotating magnetic subassemblies.

When the rotating magnetic subassemblies are positioned as shown in FIG. 2, the upper and lower concave sections 53 of the first stationary magnet subassembly 32 and the rounded end caps 43 that nest therein are magnetically coupled to the North pole face 57 and the South pole face 58, respectively, above and below the air gap portion 22. These concave sections provide a volume of magnetically permeable material in which the lines of flux can change direction and converge before crossing the air gap portion 22 through the North pole face 57 and the South pole face 58, to concentrate the lines of flux and achieve an air gap flux density higher than the saturation flux density of the permanent magnet portions of the magnet assembly.

When the rotating magnetic subassemblies are positioned as shown in FIG. 2, the upper and lower concave sections 53 of the second stationary magnet subassembly 33 and the rounded end caps 43 that nest therein provide a low reluctance path for flux lines to travel in a circuit through the second central rotating magnetic subassembly 31, the second stationary magnet subassembly 33, and the first central rotating magnetic subassembly 30 (and on through the first air gap portion 22) with little disturbance. As shown in FIG. 2, one or more tapers or chamfers may also be included in the concave sections 53, for example to carry flux between magnets with discontinuous vertical positions or to concentrate the lines of flux.

Each stationary magnet subassembly in the magnet assembly 20 preferably includes a flux return section 54, to provide a return path for the lines of magnetic flux. Each flux return section 54 in the magnet assembly 20 is preferably sized to carry an amount of flux at least as great as the flux provided by one stationary magnet subassembly (including two permanent magnet portions 50) plus the flux provided by both rotating magnetic subassemblies (including two permanent magnet portions 40) without saturating. Each flux return section 54 may include one or more chamfers, for example along the outer corners, to reduce stray flux and assembly weight.

As shown in FIGS. 2 and 3(a)–3(d), the air gap portions 22 and 24 that experience a time-varying magnetic field are not swept by the rotation of the rotating magnetic subassemblies, so those areas can be used to incorporate magnetocaloric materials, plumbing, wiring, means of translation, or other implements or objects. However, in the magnet assembly 20 the air gap portion 23 positioned directly between the rotary magnets (that experiences an intermediate magnetic field intensity at the rotational positions shown in FIGS. 2 and 3(d)) is occupied by the rotating magnetic subassemblies during rotation, and therefore cannot be used for other purposes.

Figure 4:
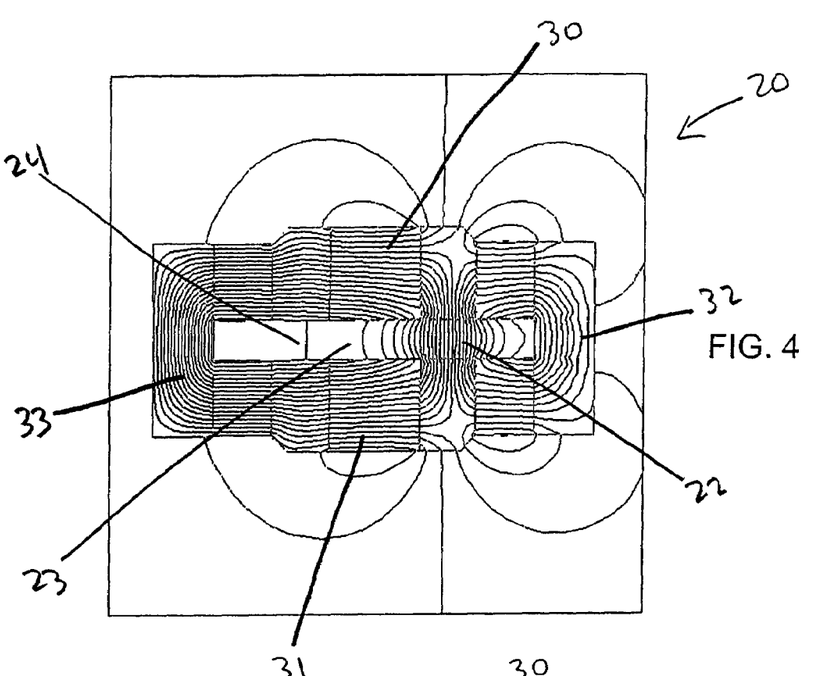
FIG. 4 shows the lines of magnetic flux in a cross-section of the magnet assembly of FIG. 1 taken along the line 2—2 thereof, with the rotating magnet subassemblies positioned as in FIG. 1.

FIG. 4 shows a computer simulation of the lines of magnetic flux in a cross-section of the magnet assembly 20 when the rotating magnet subassemblies are positioned as in FIG. 2. At that rotational position, the air gap portion 22 of the air gap contains a high density of line spacing, indicating high magnetic flux density in that area. As shown in FIG. 4, the maximum flux density in a flux return section 54 occurs on the side furthest from the high-field zone when all magnets are parallel. Thus, when the rotating magnet subassemblies are positioned as in FIG. 2, the flux density through the flux return section 54 in the second stationary magnet subassembly 33 will be at its maximum.

Figure 5:
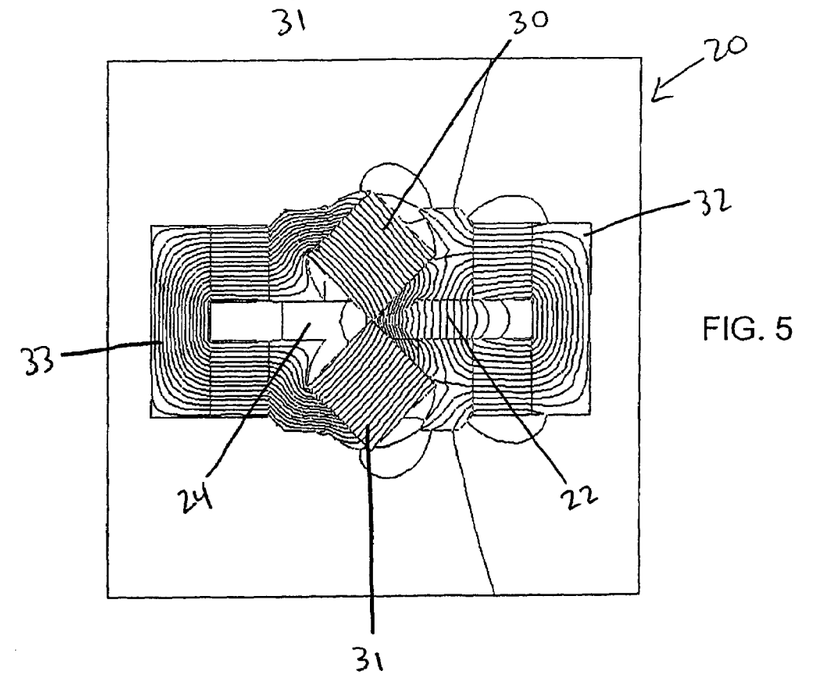
FIG. 5 shows the lines of magnetic flux in a cross-section of the magnet assembly of FIG. 1 taken along the line 2—2 thereof, with the rotating magnet subassemblies positioned as in FIG. 3(a).

FIG. 5 shows a computer simulation of the lines of magnetic flux in a cross-section of the magnet assembly 20 when the rotating magnet subassemblies are positioned at a 45° angle, as in FIG. 3(a). As shown in FIG. 5, the direction and distribution of flux has begun to change as the region of high magnetic field intensity moves from the air gap portion 22, as shown in FIG. 2, to the air gap portion 24, as shown in FIG. 3(d).

Figure 6:
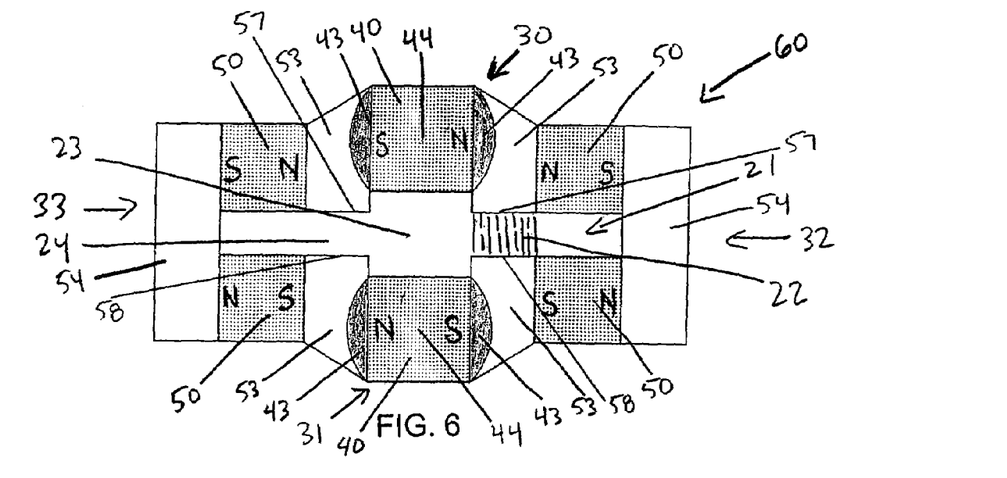
FIG. 6 shows a cross-sectional view of an alternative magnet assembly according to the invention.

FIG. 6 shows a cross-sectional view of an alternative magnet assembly 60 according to the invention. The alternative magnet assembly 60 has a similar construction to the magnet assembly 20 of FIGS. 1–5. However, a comparison of FIGS. 2 and 6 shows that the distance between the axes of rotation 44 of the rotating magnetic subassemblies 30 and 31 in the magnet assembly 60 of FIG. 6 is greater than the distance between the axes of rotation 44 of the rotating magnetic subassemblies 30 and 31 in the magnet assembly 20 of FIG. 2.

One effect of the greater separation between the rotating magnetic subassemblies in the magnet assembly 60 is to provide greater clearance between the rotating magnetic subassemblies during rotation so that the space directly between the rotating magnetic subassemblies, the third air gap portion 23 in FIG. 6, can be used for other purposes, for example to incorporate magnetocaloric materials, plumbing, wiring, means of translation, or other implements or objects.

Figure 7:
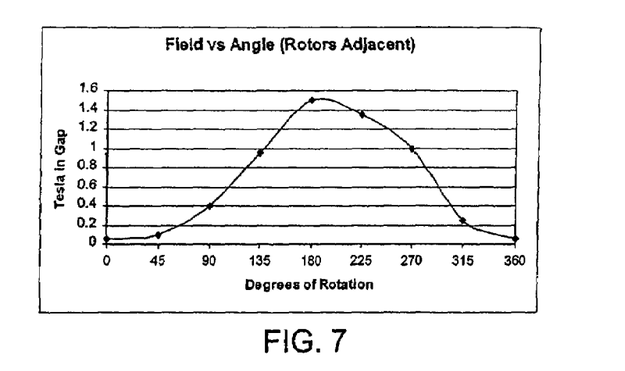
FIG. 7 is a graph of the magnetic field intensity in a portion of the air gap having a periodic magnetic field in the magnetic assembly of FIG. 1.
Figure 8:
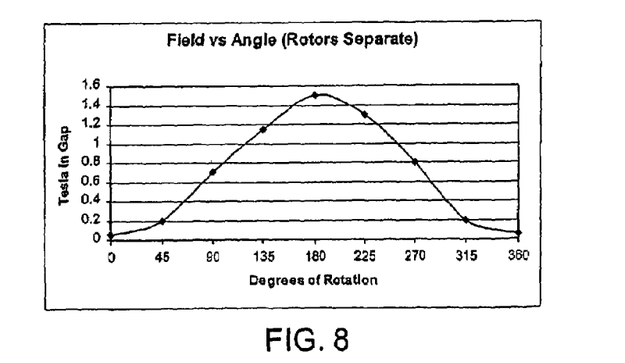
FIG. 8 is a graph of the magnetic field intensity in a portion of the air gap having a periodic magnetic field in the magnetic assembly of FIG. 6.

Another effect of the greater separation between the rotating magnetic subassemblies in the magnet assembly 60 is to alter the way the magnetic field intensity through the air gap changes over time. FIG. 7 is a graph of a simulation of the magnetic field intensity through one full cycle of rotation in the portion of the air gap marked 24 in the magnet assembly of FIG. 2. FIG. 8 is a graph of a simulation of the magnetic field intensity through one full cycle of rotation in the portion of the air gap marked 24 in the magnet assembly of FIG. 6.

As shown in FIGS. 7 and 8, for both the magnet assembly 20 and the magnet assembly 60, the maximum magnetic field in the portion of the air gap marked 24 in those figures occurs when the rotating magnet subassemblies have been rotated 180° and the minimum magnetic field occurs at 0° (360°). In both cases, the magnetic field intensity changes in an asymmetric fashion across a cycle of rotation of the rotating magnetic subassemblies.

However, the magnetized state of the air gap marked 24 in FIG. 2 is more heavily skewed toward the third quarter of a rotation in the magnet assembly 20 compared to the magnet assembly 60. The rate of field increase in the second quarter of a rotation is relatively rapid, and the rate of field decrease in the third quarter of a rotation is relatively slow, in the magnet assembly 20 compared to the magnet assembly 60. Thus, if a particular application should call for a more symmetrical field progression per zone during the rotation, the rotary magnets can each be positioned further from the horizontal centerline of the air gap.

However, increasing the distance between the axes of rotation of the rotating magnetic subassemblies can require significantly larger permanent magnet portions to produce the same maximum field differential between the high-field portions 22 and the low-field portions 24 of the air gap 21. The additional permanent magnet material can be most easily incorporated in the horizontal width of the permanent magnet portions 50 of the stationary magnet subassemblies 32 and 33, as shown in FIG. 6.

Figure 9:
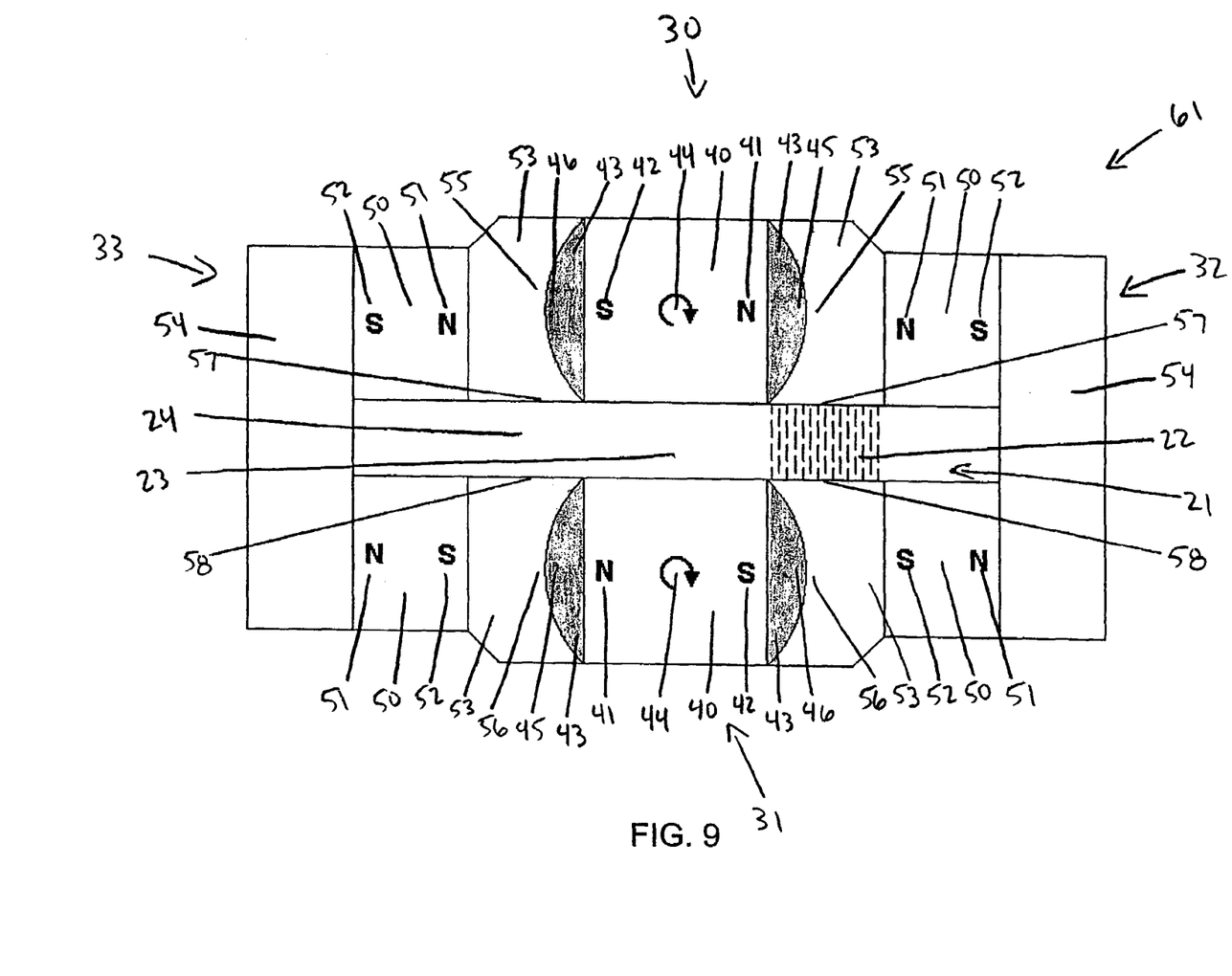
FIG. 9 shows a cross-sectional view of a second alternative magnet assembly according to the invention.
Figure 10A:
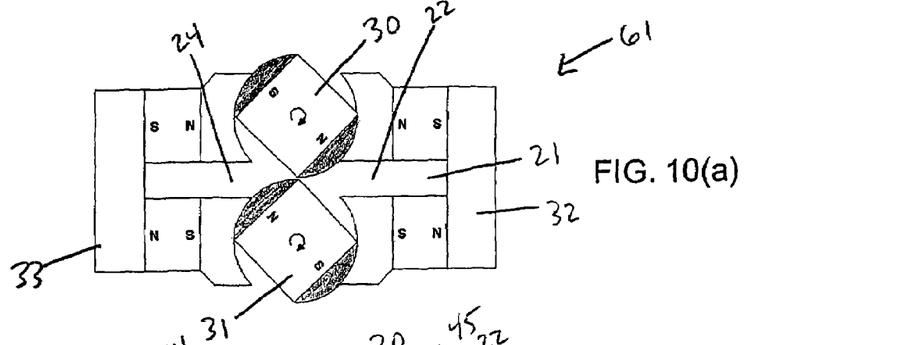
FIGS. 10(a), 10(b), 10(c), and 10(d) are cross-sectional views of the magnet assembly of FIG. 9 with the rotating subassemblies rotated 45°, 90°, 135°, and 180° respectively.
Figure 10B:
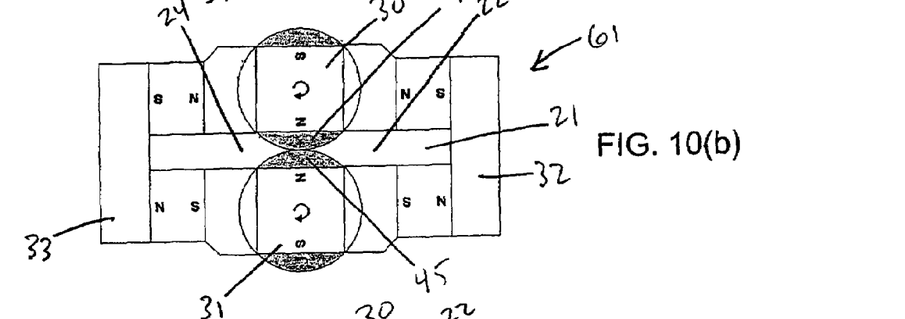
Figure 10C:
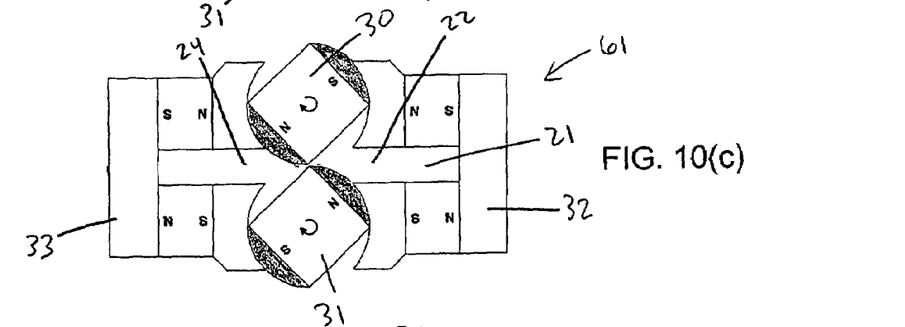
Figure 10D:
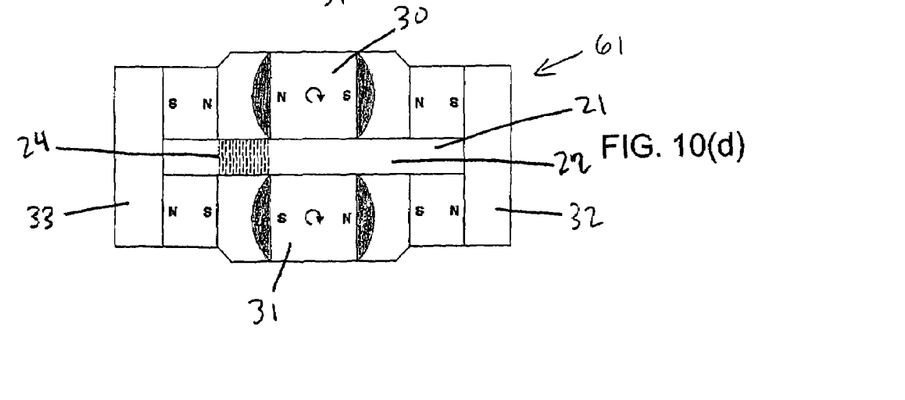

FIG. 9 shows a cross-sectional view of another alternative magnet assembly 61 according to the invention. The magnet assembly 61 has a similar construction to the magnet assembly 20 of FIG. 2. However, while the rotating magnetic subassemblies 30 and 31 in the magnet assembly 20 rotate synchronously but in opposite directions, the rotating magnetic subassemblies 30 and 31 in the magnet assembly 61 rotate synchronously in the same direction.

FIG. 9 and FIGS. 10(*a*)–(*d*) illustrate one half of a complete cycle of the magnet assembly 61. Similar to the magnet assembly 20, when the rotating magnetic subassemblies in the magnet assembly 61 are at the rotational position shown in FIG. 9, all six permanent magnets portions are aligned such that their combined magnetomotive force ("mmf") passes through the first air gap portion 22 shown in FIG. 9.

FIGS. 10(*a*), 10(*b*), and 10(*c*) show the magnet assembly 61 with the rotating magnetic subassemblies rotated 45°, 90°, and 135°, respectively, as the rotating magnetic subassemblies travel from their positions in FIG. 9 to their positions in FIG. 10(*d*). Similar to the magnet assembly 20, when the rotating magnetic subassemblies reach the rotational position shown in FIG. 10(*d*), the permanent magnet portions are aligned such that their combined magnetomotive force ("mmf") passes through the second portion 24 shown in FIG. 10(*d*). After passing through the positions in FIG. 10(*d*), the rotating magnetic subassemblies continue their rotation and return to the position shown in FIG. 9. Similar to the magnet assembly 20, the first air gap portion 22 and the second air gap portion 24 experience alternating high magnetic field intensity and low magnetic field intensity as the rotating magnetic subassemblies 30 and 31 move from their positions shown in FIG. 9 to their positions shown in FIG. 10(*d*) and back again with every cycle of the rotating magnetic subassemblies.

One effect of rotating the rotating magnetic subassemblies 30 and 31 in the same direction in the magnet assembly 61 is that the North ends 45 of the rotating magnetic subassemblies 30 and 31 are adjacent at the intermediate rotational position shown in FIG. 10(*b*). Similarly, in the magnet assembly 61, the South ends 46 of the rotating magnetic subassemblies 30 and 31 would be adjacent at a rotation of 270° (not shown in the figures). In contrast, FIGS. 3(*a*)–3(*d*) show that in the magnet assembly 20 there is no rotational position in which like magnetic poles of the rotating magnetic subassemblies 30 and 31 are adjacent.

Figure 11:
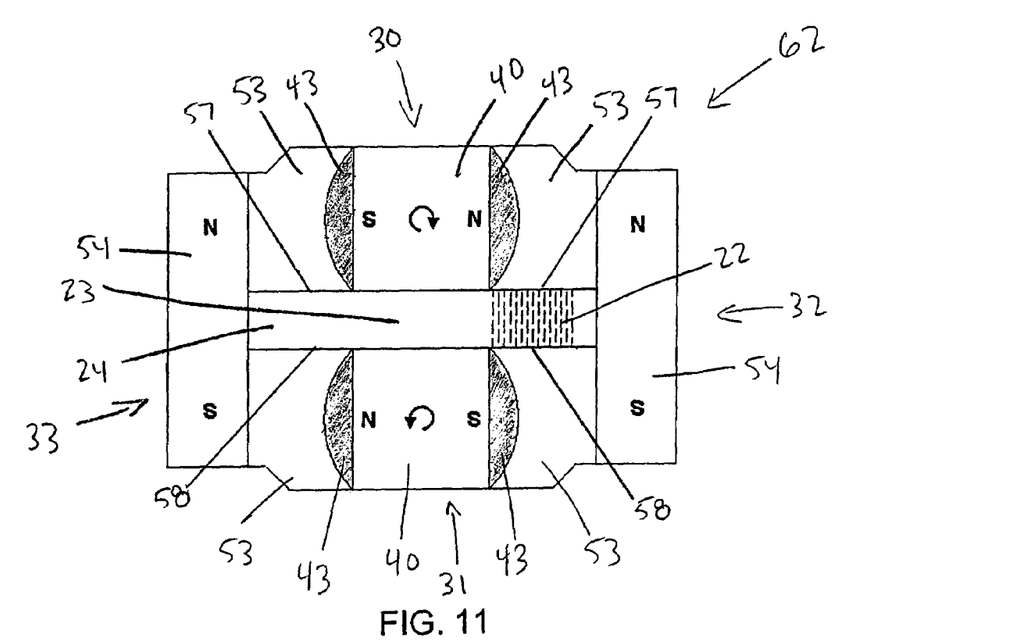
FIG. 11 shows a cross-sectional view of an exemplary magnet assembly according to another aspect of the invention.

FIG. 11 shows a cross-sectional view of another embodiment of a magnet assembly 62 according to the invention. The magnet assembly 62 has a similar construction to the magnet assembly 20 of FIG. 2. However, the stationary magnetic subassemblies 32 and 33 in the magnet assembly 62 are simpler than the stationary magnetic subassemblies 32 and 33 in the magnet assembly 20. Each stationary magnet subassembly 32 and 33 in the magnet assembly 62 includes a single permanent magnet portion 50 that replaces the two permanent magnet portions 50 and the flux return section 54 found in the stationary magnetic subassemblies 32 and 33 in the magnet assembly 20.

Figure 12:
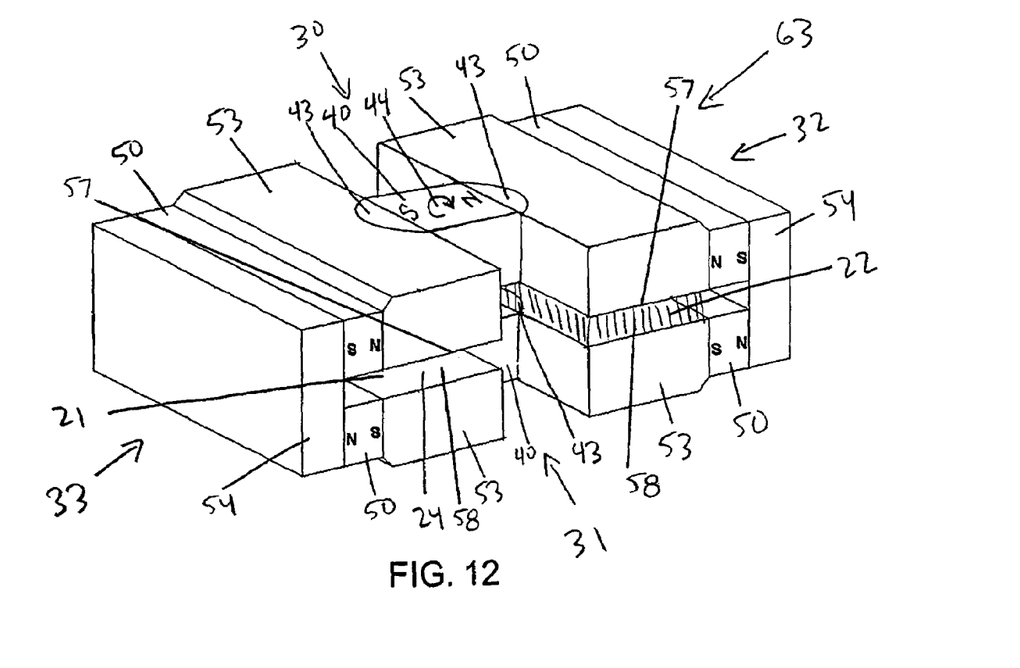
FIG. 12 shows a perspective view of an exemplary magnet assembly according to one more aspect of the invention.

FIG. 12 shows a cross-sectional view of another embodiment of a magnet assembly 63 according to the invention. The magnet assembly 63 has a similar construction to the magnet assembly 20 of FIG. 2. However, the rotating magnetic subassemblies 30 and 31 are oriented so that the axes of rotation 44 of those rotating magnetic subassemblies is parallel to the direction of the magnetic flux through the air gap. In the magnet assembly 63, the rotating magnetic subassemblies 30 and 31 could rotate in the same direction, or in opposite directions. In the magnet assembly 63 the magnetic poles of the rotating magnetic subassemblies 30 and 31 do not approach each other. Further, the rotating magnetic subassemblies do not sweep through the air gap.

There are various possibilities with regard to alternative embodiments and applications of a magnet assembly according to the invention. For example, although the exemplary embodiments of the present invention refer to specific materials, other materials known to those skilled in the art as having suitable properties can be appropriately substituted. Similarly, although the exemplary embodiments of the present invention show particular shapes and relative dimensions, other shapes and dimensions can be used.

A variety of structures can be used in a permanent magnet assembly according to the invention. For example, the permanent magnet portions shown in the illustrative embodiments herein may each comprise a single permanent magnet, or one or more of these permanent magnet portions may be a composite structure comprised of one or more permanent magnets, and one or more sections made of magnetically permeable material. The permanent magnet portions shown in the illustrative embodiments may also include one or more sections of magnetically impermeable material, for example to provide structural support, containment, or protection.

For example, a rotating magnetic subassembly for use in a magnet assembly according to the invention can be formed by fixing rounded end caps made of magnetically permeable material to a rectangular block of permanent magnet material, as shown in the illustrative embodiments herein. However, a rotating magnetic subassembly could also be formed by machining a block of permanent magnet material to obtain rounded end caps made of permanent magnet material instead of or in addition to rounded end caps formed of magnetically permeable material. If multiple rotating subassemblies are used, it is not necessary that all of the rotating subassemblies include a permanent magnet section. Some, but not all, of the rotating subassemblies may be formed entirely of magnetically permeable material without a permanent magnet section.

Similarly, a stationary magnetic subassembly for use in a magnet assembly according to the invention can be formed by fixing concave sections made of magnetically permeable material to one or more rectangular blocks of permanent magnet material, as shown in the illustrative embodiments herein. However, a stationary magnetic subassembly could also be formed by machining a block of permanent magnet material to obtain concave sections made of permanent magnet material instead of or in addition to concave sections formed of magnetically permeable material.

To optimize a permanent magnet assembly according the invention for a particular application, additional features known in the art may also be included. For example, tapered pole pieces can be used to concentrate flux across an air gap. Blocking magnets, flux containment jackets, or flux containment sheaths, chamfers, or filled-in corners can also be used, for example to optimize flux return while minimizing stray flux, assembly weight, and rotational moment of inertia.

Although permanent magnet portions and composite magnet subassemblies are described herein as having "north" and "south" ends, and may be labeled as "N" or "S" in the drawings, it should be understood that this is by way of convention only and not as a limitation. For example, while a particular embodiment may be shown in the drawings with permanent magnet portions having a particular orientation, it should be understood that an equivalent structure could be formed by substituting an "south" or "S" for every "north" or "N," and vice-versa. Thus, any claim including "north" or "south" in a limitation should be construed to also cover structures that would meet that claim with the words "north" and "south" reversed.

Although the surfaces of the north and south pole faces of the stationary magnetic subassemblies are shown herein as essentially planar, whereby the air gaps subjected to a time-varying magnetic field have a substantially rectangular cross-section, this is not required and other shapes may be used. For example, some applications of a permanent magnet assembly according to the invention could include pole faces having concave or convex shapes. Thus, the cross-section of the air gaps subjected to a time-varying magnetic field can include, but not be limited to, a rectangle (including but not limited to a square), a parallelogram, a trapezoid, a circle, an oval, or nearly any other shape or combination of shapes.

The embodiments of a permanent magnet assembly according to the invention described herein are shown in the drawings in exemplary orientations. It is understood that a permanent magnet assembly according to the invention can be used in any orientation. Any particular term such as "vertical" or "horizontal" used herein in reference to a structure does not limit that structure to any particular orientation or frame of reference.

The exemplary embodiments herein are described as including rotating subassemblies and stationary subassemblies that subject air gaps to a time-varying magnetic field. However, it should be understood that the "rotating" subassemblies in the exemplary embodiments discussed herein could also be made stationary, with the "stationary" subassemblies adapted to rotate relative to the "rotating" subassemblies, to obtain essentially the same relative motion between the "stationary" and "rotating" subassemblies.

This is particularly apparent with respect to the embodiment shown in FIG. 12. Since the two "rotating" subassemblies of FIG. 12 have a common axis of rotation, it would be straightforward to rotate the "stationary" subassemblies relative to the "rotating" subassemblies. Of course, it would also be possible to rotate both the "stationary" and the "rotating" subassemblies relative to each other in opposite directions or in the same direction at different angular velocities, to obtain essentially the same relative motion between the "stationary" and "rotating" subassemblies.

Similarly, either or both of the "stationary" and "rotating" subassemblies could be adapted to rotate in an oscillating (back and forth) fashion around a portion of an entire cycle of rotation. Thus, in the claims the term rotate is intended to encompass any form of relative motion between structures that involves rotation about at least a portion of a cycle of rotation, and is not intended to be limited to rotation in a single direction, or through an entire cycle of rotation, or with respect to which of the structures actually rotates.

It is understood that the invention is not limited to the particular embodiments described herein, but embraces all such modified forms thereof as come within the scope of the following claims.

What is claimed is:

1. A magnet assembly comprising:
   a first stationary magnet subassembly and a second stationary magnet subassembly, each stationary magnet subassembly including at least one permanent magnet section having a north end and a south end, a north concave section magnetically coupled to the north end of the permanent magnet section and including a north pole face, and a south concave section magnetically coupled to the south end of the permanent magnet section and including a south pole face opposite the north pole face in a flux direction across an air gap;
   a first rotating subassembly adapted to rotate about a first rotational axis to a first plurality of rotational positions and including at least one permanent magnet section having a north end and a south end, a north rounded end cap magnetically coupled to the north end of the permanent magnet section, and a south rounded end cap magnetically coupled to the south end of the permanent magnet section, wherein the rounded end caps of the first rotating subassembly are adapted to intermittently nest with the north concave sections of the first and second stationary magnetic assemblies as the first rotating subassembly rotates,
   a second rotating subassembly adapted to rotate about a second rotational axis to a second plurality of rotational positions and including a first rounded end cap and a second rounded end cap connected together by a magnetically permeable section, wherein the rounded end caps of the second rotating subassembly are adapted to intermittently nest with the south concave sections of the first and second stationary magnetic assemblies as the second rotating subassembly rotates, wherein when the first rotating subassembly is at a first rotational position and the second rotating subassembly is at a second rotational position, the north rounded end cap of the first rotating subassembly nests with the north concave section of the first stationary magnet subassembly, the south rounded end cap of the first rotating subassembly nests with the north concave section of the second stationary magnet subassembly, the first rounded end cap of the second rotating subassembly nests with the south concave section of the first stationary magnet subassembly, and the second rounded end cap of the second rotating subassembly nests with the south concave section of the second stationary magnet subassembly, whereby the air gap of the first stationary magnet subassembly is subjected to a relatively high magnetic field and the air gap of the second stationary magnet subassembly is subjected to a relatively low magnetic field; and wherein when the first rotating subassembly is at a third rotational position and the second rotating subassembly is at a fourth rotational position, the north rounded end cap of the first rotating subassembly nests with the north concave section of the second stationary magnet subassembly, the south rounded end cap of the first rotating subassembly nests with the north concave section of the first stationary magnet subassembly, the first rounded end cap of the second rotating subassembly nests with the south concave section of the second stationary magnet subassembly, and the second rounded end cap of the second rotating subassembly nests with the south concave section of the first stationary magnet subassembly, whereby the air gap of the second stationary magnet subassembly is subjected to a relatively high magnetic field and the air gap of the first stationary magnet subassembly is subjected to a relatively low magnetic field.

2. The magnet assembly of claim 1 wherein the first rotational axis is substantially normal to the flux direction across the air gap of the first stationary magnet subassembly.

3. The magnet assembly of claim 1 wherein the first rotational axis is substantially parallel to the flux direction across the air gap of the first stationary magnet subassembly.

4. The magnet assembly of claim 1 wherein the first rotational axis is substantially parallel to the second rotational axis, wherein the first rotating subassembly rotates in a first angular direction, and wherein the second rotating subassembly rotates synchronously with the first rotating subassembly in a second angular direction.

5. The magnet assembly of claim 4 wherein the first angular direction is the reverse of the second angular direction, whereby the first rotating subassembly rotates in the opposite direction of the second rotating subassembly.

6. The magnet assembly of claim 1 wherein each stationary magnetic subassembly includes a first permanent magnet section having a north end and a south end, a flux return portion formed of magnetically permeable material and having a first end and a second end, and a second permanent magnet section having a north end and a south end, wherein the north end of the first permanent magnet section is magnetically coupled and connected to the north concave section, wherein the south end of the first permanent magnet section is magnetically coupled and connected to the first end of the flux return portion, wherein the second end of the flux return portion is magnetically coupled and connected to the north end of the second permanent magnet section, and wherein the south end of the second permanent magnet section is magnetically coupled and connected to the south concave section.

7. The magnet assembly of claim 6 wherein the first rotational axis is substantially normal to the flux direction across the air gap of the first stationary magnet subassembly.

8. The magnet assembly of claim 6 wherein the first rotational axis is substantially parallel to the flux direction across the air gap of the first stationary magnet subassembly.

9. The magnet assembly of claim 6 wherein the first rotational axis is substantially parallel to the second rotational axis, wherein the first rotating subassembly rotates in a first angular direction, and wherein the second rotating subassembly rotates synchronously with the first rotating subassembly in a second angular direction.

10. The magnet assembly of claim 9 wherein the first angular direction is the reverse of the second angular direction, whereby the first rotating subassembly rotates in the opposite direction of the second rotating subassembly.

11. A magnet assembly comprising:

a first stationary magnet subassembly and a second stationary magnet subassembly, each stationary magnet subassembly including a north concave section with a north pole face, the north concave section magnetically coupled and connected to a south concave section with a south pole face, wherein each stationary magnet subassembly is at least partially permanently magnetized with a magnetic vector from the south concave section to the north concave section, and wherein the north pole face is opposite the south pole face in a flux direction across an air gap;

a first rotating subassembly adapted to rotate about a first rotational axis to a first plurality of rotational positions and including a north rounded end cap magnetically coupled and connected to a south rounded end cap, wherein the first rotating subassembly is at least partially permanently magnetized with a magnetic vector from the south rounded end cap to the north rounded end cap, and wherein the rounded end caps of the first rotating subassembly are adapted to intermittently magnetically couple with the north concave sections of the first and second stationary magnetic assemblies as the first rotating subassembly rotates, a second rotating subassembly having a first rounded end cap and a second rounded end cap magnetically coupled and connected to the first rounded end cap, the second rotating subassembly being adapted to rotate about a second rotational axis to a second plurality of rotational positions, wherein the rounded end caps of the second rotating subassembly are adapted to intermittently magnetically couple with the south concave sections of the first and second stationary magnetic assemblies as the second rotating subassembly rotates, wherein when the first rotating subassembly is at a first rotational position and the second rotating subassembly is at a second rotational position, the north rounded end cap of the first rotating subassembly is magnetically coupled to the north concave section of the first stationary magnet subassembly and the south rounded end cap of the first rotating subassembly is magnetically coupled to the north concave section of the second stationary magnet subassembly, whereby the air gap of the first stationary magnet subassembly is subjected to a relatively high magnetic field and the air gap of the second stationary magnet subassembly is subjected to a relatively low magnetic field; and wherein when the first rotating subassembly is at a third rotational position and the second rotating subassembly is at a fourth rotational position, the north rounded end cap of the first rotating subassembly is magnetically coupled to the north concave section of the second stationary magnet subassembly and the south rounded end cap of the first rotating subassembly is magnetically coupled to the north concave section of the first stationary magnet subassembly, whereby the air gap of the second stationary magnet subassembly is subjected to a relatively high magnetic field and the air gap of the first stationary magnet subassembly is subjected to a relatively low magnetic field.

12. The magnet assembly of claim 11 wherein the first rotational axis is substantially normal to the flux direction across the air gap of the first stationary magnet subassembly.

13. The magnet assembly of claim 11 wherein the first rotational axis is substantially parallel to the flux direction across the air gap of the first stationary magnet subassembly.

14. The magnet assembly of claim 11 wherein the first rotational axis is substantially parallel to the second rotational axis, wherein the first rotating subassembly rotates in a first angular direction, and wherein the second rotating subassembly rotates synchronously with the first rotating subassembly in a second angular direction.

15. The magnet assembly of claim 14 wherein the first angular direction is the reverse of the second angular direction, whereby the first rotating subassembly rotates in the opposite direction of the second rotating subassembly.

16. The magnet assembly of claim 11 wherein each stationary magnetic subassembly includes a first permanent magnet section having a north end and a south end, a flux return portion formed of magnetically permeable material and having a first end and a second end, and a second permanent magnet section having a north end and a south end, wherein the north end of the first permanent magnet section is magnetically coupled and connected to the north concave section, wherein the south end of the first permanent magnet section is magnetically coupled and connected to the first end of the flux return portion, wherein the second end of the flux return portion is magnetically coupled and connected to the north end of the second permanent magnet section, and wherein the south end of the second permanent magnet section is magnetically coupled and connected to the south concave section.

17. The magnet assembly of claim 16 wherein the first rotational axis is substantially normal to the flux direction across the air gap of the first stationary magnet subassembly.

18. The magnet assembly of claim 16 wherein the first rotational axis is substantially parallel to the flux direction across the air gap of the first stationary magnet subassembly.

19. The magnet assembly of claim 16 wherein the first rotational axis is substantially parallel to the second rotational axis, wherein the first rotating subassembly rotates in a first angular direction, and wherein the second rotating subassembly rotates synchronously with the first rotating subassembly in a second angular direction.

20. The magnet assembly of claim 19 wherein the first angular direction is the reverse of the second angular direction, whereby the first rotating subassembly rotates in the opposite direction of the second rotating subassembly.

21. A magnet assembly comprising:

a first stationary magnet subassembly and a second stationary magnet subassembly, each stationary magnet subassembly including at least one permanent magnet section having a north end and a south end, a north end magnetically coupled and connected to the north end of the permanent magnet section and including a north mating portion and a north pole face, and a south end magnetically coupled and connected to the south end of the permanent magnet section and including a south mating portion and a south pole face opposite the north pole face in a flux direction across an air gap;

a first rotating subassembly adapted to rotate about a first rotational axis to a first plurality of rotational positions and including a north end mating portion magnetically coupled and connected to a south end mating portion, wherein the first rotating subassembly is at least partially permanently magnetized with a magnetic vector from the south end mating portion to the north end mating portion, and wherein the end mating portions of the first rotating subassembly are adapted to intermittently magnetically couple with the north mating portions of the first and second stationary magnetic assemblies as the first rotating subassembly rotates, a second movable subassembly including a first end mating portion connected and magnetically coupled to a second end mating portion, the second movable subassembly being movable to a second plurality of positions including a first position wherein the first end mating portion of the second movable subassembly nests with and magnetically couples to the south mating portion of the first stationary magnetic subassembly and the second end mating portion of the second movable subassembly nests with and magnetically couples to the south mating portion of the second stationary magnetic subassembly;

wherein when the first rotating subassembly is at a first rotational position in the first plurality of rotational positions and the second movable subassembly is in the first position in the second plurality of positions, the north end mating portion of the first rotating subassembly is magnetically coupled to the north mating portion of the first stationary magnet subassembly, the south end mating portion of the first rotating subassembly is magnetically coupled to the north mating portion of the second stationary magnet subassembly, and the south mating portions of the first and second stationary magnet subassemblies are magnetically coupled through the second movable subassembly, whereby the air gap of the first stationary magnet subassembly is subjected to a relatively high magnetic field and the air gap of the second stationary magnet subassembly is subjected to a relatively low magnetic field.

22. The magnet assembly of claim 21 wherein the first rotational axis is substantially normal to the flux direction across the air gap of the first stationary magnet subassembly.

23. The magnet assembly of claim 21 wherein the first rotational axis is substantially parallel to the flux direction across the air gap of the first stationary magnet subassembly.

24. The magnet assembly of claim 21 wherein each stationary magnetic subassembly includes a first permanent magnet section having a north end and a south end, a flux return portion formed of magnetically permeable material and having a first end and a second end, and a second permanent magnet section having a north end and a south end, wherein the north end of the first permanent magnet section is magnetically coupled and connected to the north mating portion, wherein the south end of the first permanent magnet section is magnetically coupled and connected to the first end of the flux return portion, wherein the second end of the flux return portion is magnetically coupled and connected to the north end of the second permanent magnet section, and wherein the south end of the second permanent magnet section is magnetically coupled and connected to the south mating portion.

25. The magnet assembly of claim 24 wherein the first rotational axis is substantially normal to the flux direction across the air gap of the first stationary magnet subassembly.

26. The magnet assembly of claim 24 wherein the first rotational axis is substantially parallel to the flux direction across the air gap of the first stationary magnet subassembly.

27. The magnet assembly of claim 24 wherein the north mating portion of each stationary magnet subassembly comprises a concave section formed of magnetically permeable material, wherein the first permanent magnet section of each stationary magnet subassembly comprises a rectangular bar permanent magnet, wherein the second permanent magnet section of each stationary magnet subassembly comprises a rectangular bar permanent magnet, and wherein the south mating portion of each stationary magnet subassembly comprises a concave section formed of magnetically permeable material.

28. The magnet assembly of claim 21 wherein the second movable subassembly is at least partially permanently magnetized with a magnetic vector from the second end mating portion to the first end mating portion, wherein the first end mating portion is a north end mating portion and the second end mating portion is a south end mating portion.

* * * * *